(12) United States Patent
Gadkaree et al.

(10) Patent No.: US 9,754,734 B2
(45) Date of Patent: Sep. 5, 2017

(54) POLY-VINYLIDENE DIFLUORIDE ANODE BINDER IN A LITHIUM ION CAPACITOR

(71) Applicant: Corning Incorporated, Corning, NY (US)

(72) Inventors: Kishor Purushottam Gadkaree, Painted Post, NY (US); Rahul Suryakant Kadam, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/427,382

(22) Filed: Feb. 8, 2017

(65) Prior Publication Data
US 2017/0148581 A1 May 25, 2017

Related U.S. Application Data

(63) Continuation of application No. 14/610,811, filed on Jan. 30, 2015, now Pat. No. 9,607,778.

(51) Int. Cl.
*H01G 11/62* (2013.01)
*H01G 11/52* (2013.01)
(Continued)

(52) U.S. Cl.
CPC ............ *H01G 11/38* (2013.01); *H01G 11/06* (2013.01); *H01G 11/44* (2013.01); *H01G 11/50* (2013.01);
(Continued)

(58) Field of Classification Search
CPC ........ H01G 11/62; H01G 11/06; H01G 11/38; H01G 11/50; H01G 11/52; H01G 11/44; H01M 4/623; Y02E 60/13
(Continued)

(56) References Cited

U.S. PATENT DOCUMENTS 7,283,349 B2   10/2007   Yoshida et al.
7,582,902 B2   9/2009   Tano et al.
(Continued)

FOREIGN PATENT DOCUMENTS

CN    10126539    9/2008
EP    0767505     4/1997
(Continued)

OTHER PUBLICATIONS

Chang et al., The Influence of Different Electrode Fabrication Methods and Poly(Vinylidene Fluoride) Binders on the Anode Electrode Dimension Stability and Cyclability in Lithium-Ion Batteries, Journal of New Materials for Electrochemical Systems 11, 43-47 (2008).

(Continued)

*Primary Examiner* — Eric Thomas
*Assistant Examiner* — Michael P McFadden
(74) *Attorney, Agent, or Firm* — John L. Haack

(57) ABSTRACT

A lithium ion capacitor, including: an anode including: a conductive support; a first mixture coated on the conductive support including: an interclating carbon; a conductive carbon black; and a PVDF binder in amounts as defined herein, and where the PVDF binder has a weight average molecular weight of from 300,000 to 400,000; and a second mixture coated on the first mixture, the second mixture comprising micron-sized lithium metal particles having an encapsulating shell comprised of $LiPF_6$, mineral oil, and a thermoplastic binder. Also disclosed is a method of making and using the lithium ion capacitor.

3 Claims, 5 Drawing Sheets

(51) Int. Cl.
    *H01G 11/06* (2013.01)
    *H01G 11/38* (2013.01)
    *H01G 11/60* (2013.01)
    *H01G 11/44* (2013.01)
    *H01G 11/50* (2013.01)

(52) U.S. Cl.
    CPC ............ *H01G 11/52* (2013.01); *H01G 11/60* (2013.01); *H01G 11/62* (2013.01)

(58) Field of Classification Search
    USPC ....................................................... 361/502
    See application file for complete search history.

(56) References Cited

U.S. PATENT DOCUMENTS

| | | |
|---|---|---|
| 7,625,839 B2 | 12/2009 | Hirahara et al. |
| 7,964,173 B2 | 6/2011 | Oyama et al. |
| 8,142,930 B2 | 3/2012 | Kojima et al. |
| 8,318,356 B2 | 11/2012 | Gadkaree et al. |
| 8,524,632 B2 | 9/2013 | Gadkaree et al. |
| 8,541,338 B2 | 9/2013 | Gadkaree et al. |
| 8,652,995 B2 | 2/2014 | Gadkaree et al. |
| 8,784,764 B2 | 7/2014 | Gadkaree et al. |
| 9,108,852 B1 | 8/2015 | Gadkaree et al. |
| 2008/0165471 A1 | 7/2008 | Kojima et al. |
| 2009/0214949 A1 | 8/2009 | Ugawa |
| 2011/0261501 A1* | 10/2011 | Gadkaree ............... H01G 11/32 361/502 |
| 2013/0194721 A1 | 8/2013 | Cho et al. |
| 2013/0201606 A1 | 8/2013 | Nansaka et al. |
| 2013/0202945 A1 | 8/2013 | Zhamu et al. |
| 2013/0209348 A1 | 8/2013 | Ludvik et al. |
| 2014/0079994 A1 | 3/2014 | Affinito et al. |
| 2014/0101992 A1 | 4/2014 | Mennell et al. |
| 2014/0134438 A1* | 5/2014 | Gadkaree ................. B22F 1/02 428/402.24 |
| 2014/0146440 A1 | 5/2014 | Gadkaree et al. |
| 2014/0177136 A1 | 6/2014 | Kim et al. |
| 2014/0293507 A1 | 10/2014 | Gadkaree et al. |
| 2016/0087263 A1 | 3/2016 | Gadkaree et al. |
| 2016/0133394 A1 | 5/2016 | Sakshaug et al. |

FOREIGN PATENT DOCUMENTS

| | | |
|---|---|---|
| EP | 2958122 | 12/2015 |
| JP | 2004266239 | 9/2004 |
| JP | 2005302300 | 10/2005 |
| JP | 2006086148 | 3/2006 |
| JP | 2008289820 | 12/2008 |
| JP | 2010118216 | 5/2010 |

OTHER PUBLICATIONS

Liu et al., Particles and Polymer Binder Interaction: A Controlling Factor in Lithium-Ion Electrode Performance, Journal the Electrochemical Society, 159(3), A214-A221 (2012).
Yoo et al., Interaction of Poly(vinylidene fluoride) with Graphite Particles. 1. Surface Morphology of a Composite Film and Its Relation to Prtocessing Parameters, Chem. Mater., 15, 850-861 (2003).
Yoo et al., Interaction of Poly(vinylidene fluoride) with Graphite Particles. 2. Effect of Solvent Evaporation Kinetics and Chemical Properties of PVDF on the Surface Morphology of a Composite Film and Its Relation to Electrochemical Performance, Chem. Mater., 16, 1945-1953 (2004).
Lastoskie et al. "Pore Size Distribution Analysis of Microporous Carbons: A Density Function Theory Approach", J. Phys. Chem. 1993, 97, 4786-4796.
International Rearch Report and Written Opinion PCT/US2015/061796 Dated Apr. 13, 2016.
International Search Report and Written Opinion PCT/US2016/015273 Dated Apr. 15, 2016.
Shu et al. J. Electrochem. Soc., vol. 140, No. 4, 922-927, Apr. 1993.
International Search Report and Written Opinion PCT/US2016/015245 Dated May 12, 2016.
International Search Report and Written Opinion PCT/US2016/015041 Dated Jun. 13, 2016.
International Search Report and Written Opinion PCT/US2016/015033 Dated May 10, 2016.
International Search Report and Written Opinion PCT/US2013/015244 Dated Jun. 2, 2016.

* cited by examiner

POLY-VINYLIDENE DIFLUORIDE ANODE BINDER IN A LITHIUM ION CAPACITOR

This application is a continuation of U.S. patent application Ser. No. 14/610,811 filed on Jan. 30, 2015, the entire content of which is hereby incorporated by reference.

CROSS-REFERENCE TO RELATED APPLICATIONS

The present application is related to commonly owned and assigned USSN Application Nos.:

Ser. No. 14/610,752 filed Jan. 30, 2015, entitled "COKE SOURCED ANODE FOR LITHIUM ION CAPACITOR";

Ser. No. 14/610,782 filed Jan. 30, 2015, entitled "ANODE FOR LITHIUM ION CAPACITOR", U.S. Pat. No. 9,552,930 issued Jan. 24, 2017;

Ser. No. 14/610,848 filed Jan. 30, 2015, entitled "PHENOLIC RESIN SOURCED CARBON ANODE IN A LITHIUM ION CAPACITOR"; and Ser. No. 14/610,868 filed Jan. 30, 2015, entitled "CATHODE FOR LITHIUM ION CAPACITOR," but does not claim priority thereto.

The entire disclosure of each publication or patent document mentioned herein is incorporated by reference.

BACKGROUND

The disclosure relates to an anode, a lithium ion capacitor article, and to methods thereof.

SUMMARY

In embodiments, the disclosure provides an anode composition for a lithium ion capacitor including a polyvinylidene difluoride (PVDF) binder as defined herein.

BRIEF DESCRIPTION OF THE DRAWINGS

Features shown in the drawing are illustrative of selected embodiments of the present description and are not necessarily to proper scale.

In embodiments of the disclosure.

DETAILED DESCRIPTION

Figure 1:
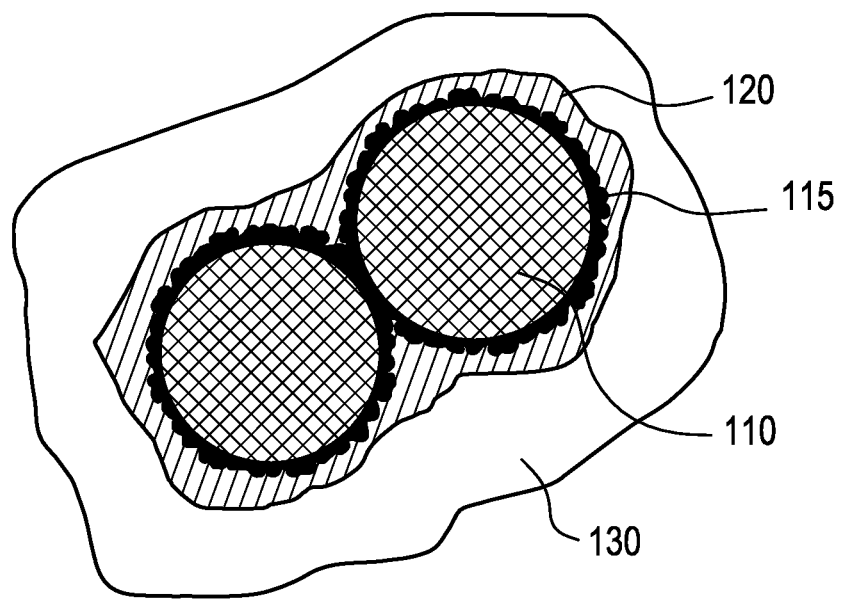
FIG. 1 shows a PRIOR ART schematic of different hypothetical physical states of PVDF polymer when interacting with a solid particle (see Chang, et al., *J. Electrochem. Soc.*, 159 (3) A214-A221 (2012)).

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Features or aspects recited in any of the claims are generally applicable to all facets of the invention. Any recited single or multiple feature or aspect in any one claim can be combined or permuted with any other recited feature or aspect in any other claim or claims.

Definitions

"PVDF", "KYNAR", and like terms refer to polyvinylidene difluoride. The chemical structure of polyvinylidene difluoride is —$(CF_2—CH_2—)_n$— where "n" represents the number of repeat "mers" or monomer units in the polymeric structure. Generally, the higher the number of polymeric repeat units in a polymer the higher the molecular weight of the polymer. The molecular weight of the PVDF binder can play a significant role in the structural integrity and the electrochemical performance of the anode in an electrochemical cell.

"PVDF 1" and like terms refer to a specific polyvinylidene difluoride (PVDF) polymer having a weight average molecular weight of from 300,000 to 400,000.

"Anode," "anode electrode," "negative electrode," or like terms refers to an electrode through which positive electric charge flows into a polarized electrical device and electrons flow out of the electrode to an outside circuit.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Lithium ion capacitors (LICs) are a class of innovative hybrid energy storage devices, which devices contains functionalities from both lithium ion batteries and electrochemical double layer capacitors (EDLC). LICs have, for example, 5 to 10 times greater energy density than EDLCs and have the advantage of high power density and long cycle life. Unlike the EDLCs, where both the electrodes comprises of high surface area activated carbon, LICs, in contrast, use a high surface area carbon on the positive electrode (cathode), and an intercalating carbon which supports the fast intercalation and de-intercalation of lithium ions on the anode. During charge and discharge, lithium intercalation and de-intercalation occurs within the bulk of the negative electrode, whereas anion adsorption and desorption takes place at the cathode. The adsorption and desorption on the cathode is a non-faradaic reaction, which is relatively faster than the lithium ion intercalation and de-intercalation on the anode. Therefore, the kinetics of the cell is controlled by the structure of the anode.

Stability of the anode is a significant role in the capacitance output and voltage limit on the lithium ion capacitor. The construction details of the anode are very significant in capacitor fabrication. The choices of the carbon, the conductive carbon, the binder, the current collector, and the type of current collector used for the negative electrode will have a direct effect on the performance of the lithium ion capacitor.

The role of the binder in an electrode is to maintain the physical and mechanical integrity of the carbon coating and its adhesion to the conductive current collector (e.g., a metal such as copper) without being electrochemically active.

PVDF is a binder widely used for the fabrication of electrodes because of PVDF's good chemical and electrochemical stability, and PVDF's adhesion to the electrode materials and to the current collector. However, the grade and molecular weight of PVDF used can affect chemical and electrochemical stability of the electrode and hence the device. It has been reported (see *Chem. Mater.*, 2004, 16, 1945-1953) that a better distribution and hence better performance could be obtained by higher molecular weight PVDF (ca. 1,000,000). However, it was unexpectedly discovered that a lower molecular weight PVDF (e.g., 300,000 to 400,000) based anode electrode had superior performance in a working lithium ion capacitor contrary to the prior report.

In embodiments, the disclosure provides a PVDF binder having a specific molecular weight, prepared by emulsion polymerization, and the PVDF binder is used in an anode in a lithium ion capacitor.

In embodiments, the disclosure provides a lithium ion capacitor having a high mechanical integrity and a superior electrochemical performance in a lithium ion capacitor.

In embodiments, the disclosure provides a method of making an anode for a lithium ion capacitor, the anode having a binder comprising a polyvinylidene difluoride (PVDF) polymer, the polymer having a weight average molecular weight of from 300,000 to 400,000 ("PVDF 1").

In embodiments, the disclosure provides an anode structure in a lithium ion capacitor having a PVDF binder having superior mechanical performance (i.e., adhesion).

In embodiments, the disclosure provides an LIC having an anode made from a selected molecular weight PVDF polymer, the anode having superior electrochemical performance of in a full working lithium ion capacitor.

In embodiments, the disclosure provides an LIC having a superior anode made from a low molecular PVDF polymer compared with a medium molecular weight polymer or a high molecular weight PVDF polymer.

The disclosure provides advantages of using PVDF binder having a specific molecular weight, synthesized by emulsion polymerization, and used in the fabrication of anode electrode in a lithium ion capacitor.

The evaluation data demonstrates that a lithium ion capacitor fabricated with an anode comprising the PVDF 1 had the lowest irreversible capacities compared to the lithium ion capacitors made with anodes comprising PVDF 2 or PVDF 3, respectively. Irreversible capacity indicates the amount of lithium reacted with the surface of the electrode containing carbon and the binder, and thereafter is unavailable for the charge-discharge process. Additionally, the lithium ion capacitor having an anode comprising of PVDF 1 also exhibits a lower ESR which yields higher power. The effect of molecular weight of the binder on device performance is very significant.

The disclosed anode having a PVDF 1 exhibits, for example: superior mechanical electrode integrity, which is advantaged in better handling capability and superior long lasting electrochemical performance; low irreversible capacity, which results in high energy density; low resistance, which results in high power density performance, which is an indispensable attribute for a lithium ion capacitor, or a combination of these characteristics.

The disclosed high performance LIC device based on the disclosed binder system provides high performance LICs having significant differential advantages over existing products or technology.

In embodiments, the disclosure provides a lithium ion capacitor, comprising:
  an anode comprising:
    a conductive support, e.g., metal such as copper or aluminum;
    a first mixture coated on the conductive support comprising:
      a carbon sourced from coconut shell flour in from 85 to 95 wt %, e.g., 90 wt %,
      a conductive carbon black in from 1 to 8 wt %, e.g., 5 wt % Timcal Super C-45 conductive carbon; and
      a PVDF binder in from 3 to 10 wt %, e.g., 5 wt %, where the wt % is based on the total weight of the first mixture, and where the PVDF binder has a weight average molecular weight of from 300,000 to 400,000; and
    a second mixture coated on the first mixture, the second mixture comprising micron-sized lithium metal particles having an encapsulating shell comprised of $LiPF_6$, mineral oil, and a thermoplastic binder, such as styrene butadiene rubber (SBR).

In embodiments, the conductive support can be, any suitably conductive materials, for example, a copper foil, an aluminum foil, and like materials, or combinations thereof.

In embodiments, the capacitor can further comprise: a separator; and a cathode electrode coupled with the separator, the cathode electrode comprising an alkali activated carbon sourced from wheat flour in from 80 to 95 wt %, e.g., 85 wt %, a fluorinated polymer in from 3 to 12 wt %, e.g., 10% PTFE (DuPont 601A Teflon PTFE), and carbon black in from 1 to 8 wt %, e.g., 5% Cabot Black Pearl 2000 carbon black; and an electrolyte comprising an inorganic lithium salt in a non-aqueous and aprotic solvent.

In embodiments, the electrolyte can comprise, for example, an inorganic lithium salt for example, $LiPF_6$, and like salts, or mixtures thereof, and the non-aqueous and aprotic electrolyte solvent is a mixture of major amounts of ethylene carbonate, dimethyl carbonate, methyl propionate, and a minor amount of fluorinated ethylene carbonate. In embodiments, the LiPF$_6$ can be present, for example, in from 0.8 to 1.2 M and the non-aqueous and aprotic solvent can be present, for example, as a mixture of 20:20:60 (by volume) of ethylene carbonate:dimethyl carbonate:methyl propionate, and 3 to 8 wt % by superaddition of fluorinated ethylene carbonate.

In embodiments, the capacitor can have a higher operating power density, for example, of from 15 to 50 W/l at 100 C rate compared to the same capacitor having an anode made of a PVDF binder having a higher weight average molecular weight of greater than 480,000.

In embodiments, the disclosure provides a method of using the disclosed capacitor, comprising:

discharging the capacitor to provide a power density of from 15 to 50 W/l at 100 C rate, which is higher compared to the same anode having a PVDF binder having a higher weight average molecular weight of greater than 480,000.

In embodiments, the method of using can further comprise discharging the capacitor in combination with at least one of: a vehicle, an electronic appliance, a consumer electronic device, a component of an electrical grid system, or a combination thereof. The capacitor can be used in combination with another system having a need for storage, supply, or both, of power, for example, at least one of: a vehicle, a consumer electronic device, an electronic appliance, a component of an electrical or power grid system, or a combination thereof. A vehicle can be, for example, a mobile machine that transports, for example, people, cargo, or a purposeful payload, such as camera or an military ordinance in a drone or unmanned aerial system (UAS). Other examples of vehicles are wagons, bicycles, motor vehicles (e.g., motorcycles, cars, trucks, buses, trains), watercraft (e.g., ships, boats), spacecraft, aircraft, or combinations thereof.

Referring to the Figures, FIG. 1 shows a schematic (100) of different physical states of a PVDF polymer when interacting with a solid particle such as an activated carbon particle. Not wanting to be bound by theory, in a mixture of a PVDF polymer and activated carbon particles (110) used in making an electrode, three different PVDF polymer layers could hypothetically form or be present. The PVDF tends to chemically bond or physically absorb to form a "bound layer" (115), having a thickness of about 1 to 5 nanometers, on the surface of the carbon particles depending on the surface functional groups of the carbon particles. The bound layer has significantly different properties than the actual PVDF binder in the free state (i.e., the PVDF which is not bound to the particles and is in a free state by itself). Due to the interaction of the polymer with the carbon particles, the physical properties such as chain conformations, crystallinity, solubility, and like physical properties, change. Next to the bound layer, there can be another layer, having a thickness of about 2 to 35 nanometers, referred to as the immobilized layer (120) having limited mobility. Next to the immobilized layer there can be a third layer (130) known as the free polymer domain. The free polymer domain does not form unless the bound (115) and immobilized (120) layers are present on the surface of the particles (see Chang, et al., supra.). The molecular weight of the PVDF controls the nature and extent of the bound, immobilized, and free layer, and can affect the adhesion of the carbon particles to the copper current collector, and the cohesion between the carbon particles, and the adhesion and cohesion can affect the contact resistance directly. The better the adhesion and cohesion, the lower the resistance of the electrode, which lower resistance assists in providing a better conduction path for the ions and electrons through the electrode. The molecular weight of the PVDF selected can significantly affect the surface distribution of PVDF throughout the electrode, which can impact the adhesion and cohesion of the carbon to the current collector and other carbon particles, respectively.

The prior art does not provide guidance regarding the effect of the molecular weight of a PVDF as a binder on the anode, and its effect on the device performance. Experimentally, it is very difficult, if not impossible, to clearly identify the abovementioned three different layers around the particles microscopically, and to understand the effects of molecular weight on the relative layer thickness, etc. Accordingly, experiments were performed on anodes having different molecular weight PVDF grades as binders directly evaluate the effect of molecular weight on the performance of the device.

Also, during the insertion and de-insertion of lithium ions in the electrode during the charging and discharging step, swelling and contraction of the electrode takes place. The swelling and contraction causes stress on the integrity of the electrode and is one of the most significant causes of failure of the electrode. The molecular weight of the PVDF significantly affects the integrity of the electrode during charging and discharging of the electrode, which characteristic directly affects the cycle life of the cell. Table 1 lists three different grades of PVDF made by emulsion homo-polymerization and having different molecular weights, that were investigated to develop superior electrodes.

TABLE 1

Evaluated emulsion polymerization PVDF grades.

| PVDF Number | KYNAR grade PVDF | Molecular Weight ($M_W$) |
| --- | --- | --- |
| 1 | 761 | 300,000 to 400,000 |
| 2 | 301F | 500,000 to 700,000 |
| 3 | HSV 900 | 1,000,000 approx. |

Figure 2:
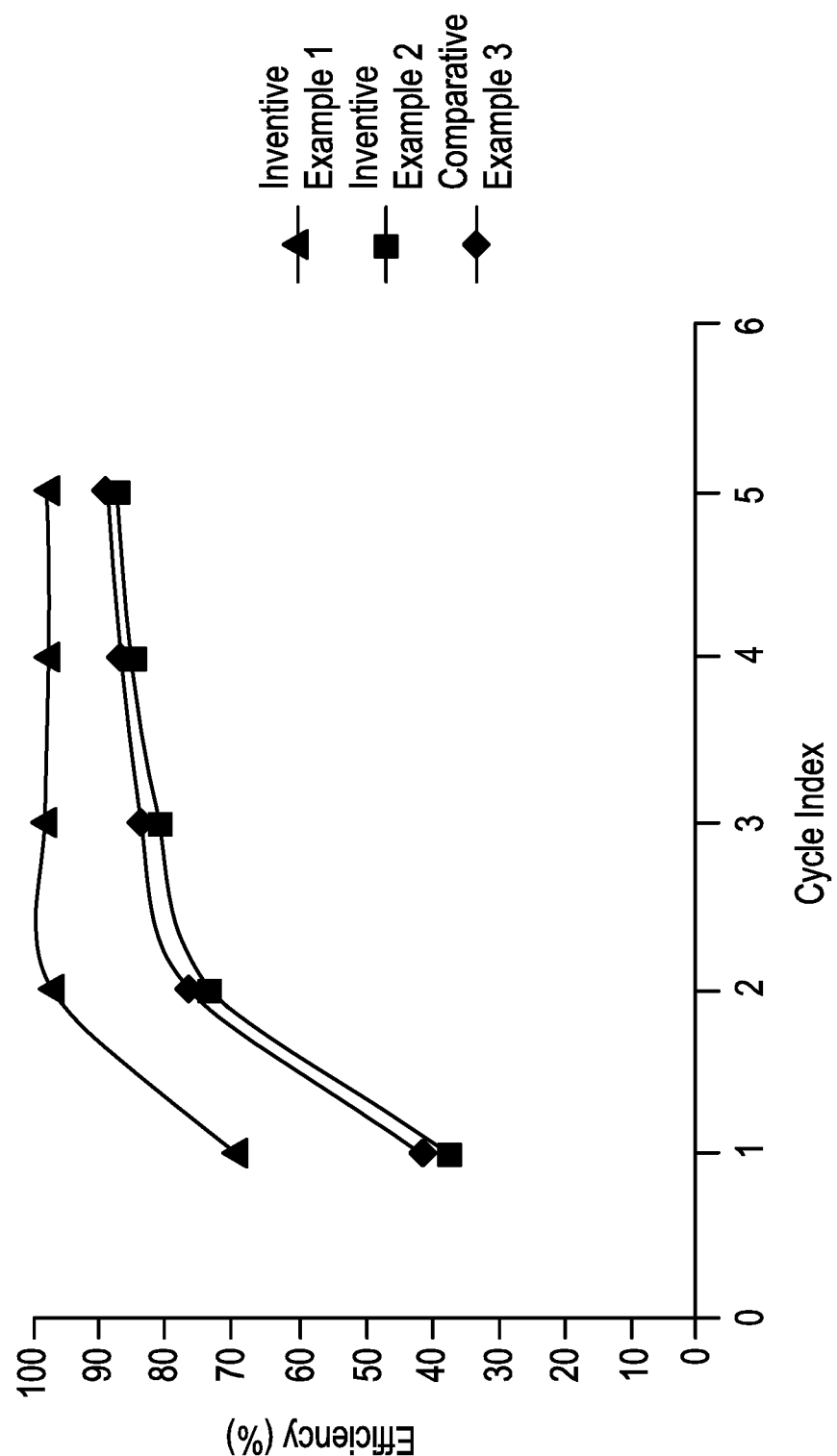
FIG. 2 shows Cycle Efficiency for anode electrodes made with PVDF polymers of Examples 1, 2, and 3, having different molecular weights.
Figure 3:
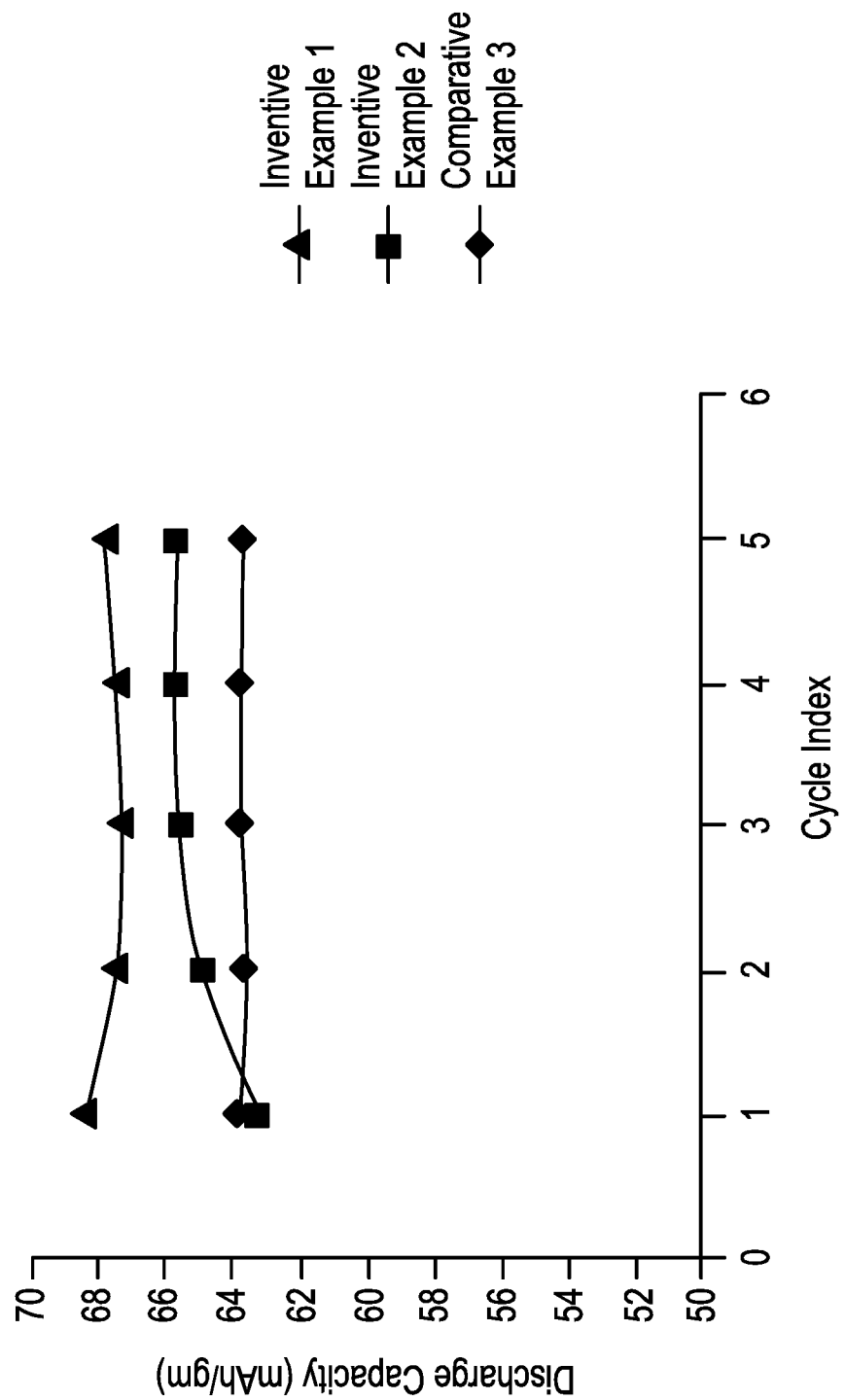
FIG. 3 shows Discharge Capacities in mAh/gm for anode electrodes made with PVDF polymers of Examples 1, 2, and 3, having different molecular weights.
Figure 4:
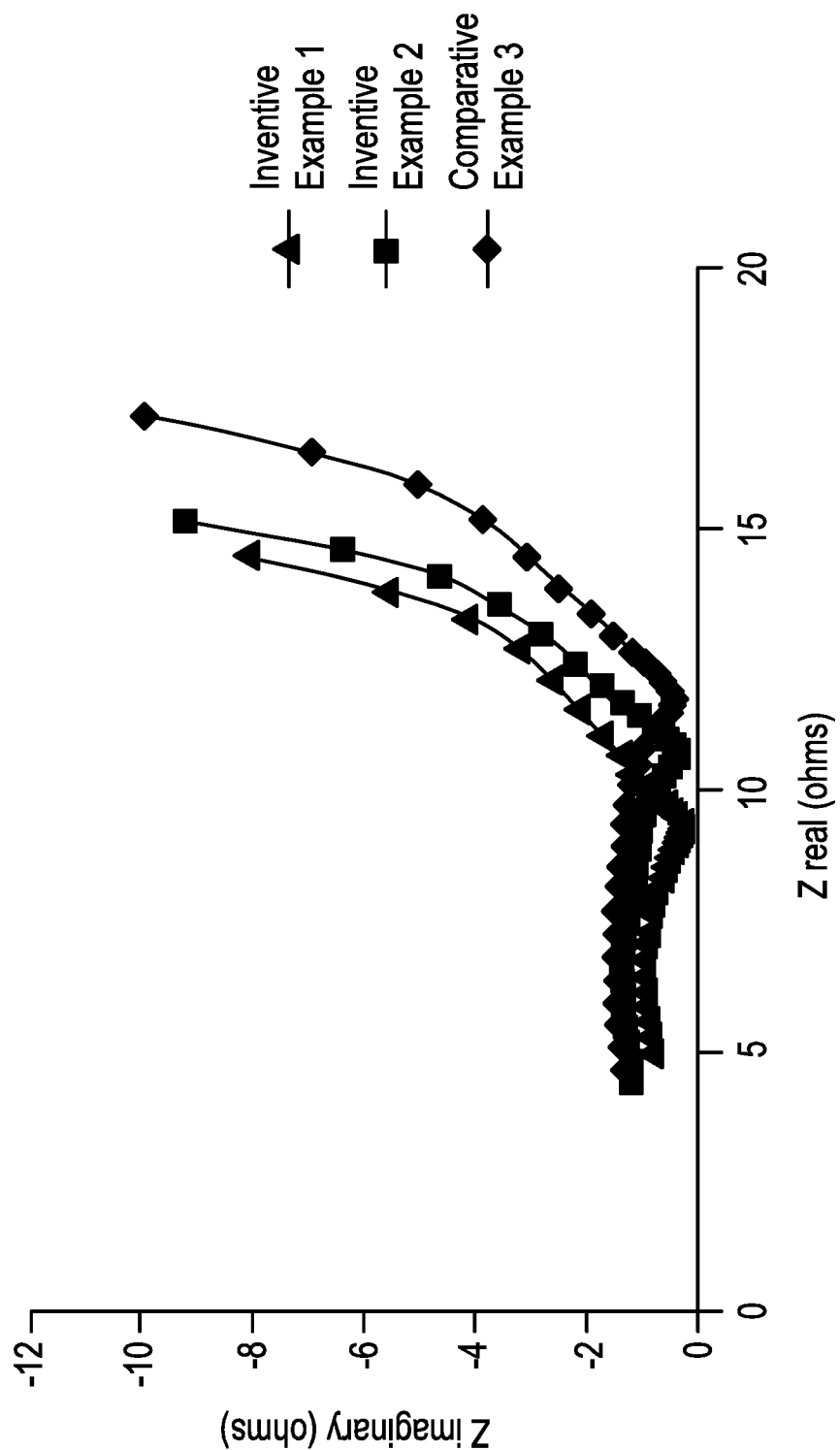
FIG. 4 shows electronic and ionic component from EIS spectra at 3.8V for anode electrodes made with PVDF polymers of Examples 1, 2, and 3, having different molecular weights.

In embodiments, the disclosure provides advantages of using PVDF 1 (i.e., a lower molecular weight PVDF) over PVDF 2 (i.e., medium molecular weight PVDF) or PVDF 3 (i.e., high molecular weight PVDF) in making carbon based anodes (negative electrodes) for a working lithium ion capacitor and its effects on the electrochemical performance of the anode. In a working lithium ion capacitor, the anode electrode has to endure the mechanical and the electrochemical stress during the handling, packaging, and electrochemical testing. To that effect, the better the adhesion of the carbon material to the copper current collector and the cohesion of the carbon particles among themselves, the better is the electrochemical performance of the electrode. With that context, a lithium ion capacitor comprising an anode having PVDF 1 had an irreversible capacity of 30.18%, a lithium ion capacitor comprising an anode having PVDF 2 had an irreversible capacity of 62.65%, and a lithium ion capacitor comprising an anode having PVDF 3 had an irreversible capacity of 58.83% (FIG. 2, Table 2).

Lower irreversible capacity results in higher energy density (Wh/l) due to availability of more lithium for the charge-discharge cycles. The discharge capacity of a cell is the amount of charge which can be extracted out of the cell and depends on various factors, such as the binder selected. After five (5) conditioning cycles, the lithium ion capacitor comprising an anode having PVDF 1 gave a discharge capacity of 67.86 mAh/gm, a lithium ion capacitor comprising anodes with PVDF 2 and PVDF 3, respectively, gave discharge capacities of 65.72 mAh/gm and 63.74 mAh/gm. The electrochemical impedance spectroscopy (i.e., AC impedance EIS spectra) shows an impedance of 8.8 ohms, 10.69 ohms, and 11.66 ohms for lithium ion capacitors comprising anodes made with PVDF 1, PVDF 2, and PVDF 3, respectively, and tested in coin cells. Lower impedance for anode having the PVDF 1 assists in achieving high power density performance at higher rates.

TABLE 2

Irreversible Capacity % for anode electrodes having different MW PVDFs.

| Binder | First Cycle Efficiency % | Irreversible Efficiency % |
|---|---|---|
| Example 1 | 69.82 | 30.18 |
| Example 2 | 37.35 | 62.65 |
| Example 3 | 41.17 | 58.83 |

TABLE 3

EIS Spectra for LICs with anodes having different MW PVDFs.

| PVDF Grade Used in Anodes | Resistance measured at 3.8 V (ohms) |
|---|---|
| Example 1 | 8.88 |
| Example 2 | 10.69 |
| Example 3 | 11.66 |

EXAMPLES

The following Examples demonstrate making, use, and analysis of the disclosed PVDF anode and a LIC thereof, and methods in accordance with the above general procedures.

Example 1

Inventive KYNAR 761-PVDF 1 Coconut shell flour 200 mesh was acquired from Reade Advanced Materials. The flour was then carbonized to 1000° C. for 2 hrs under nitrogen conditions. The resulting carbon was then washed with aq. 1N HCl overnight followed by washes with distilled water to pH 7. The carbon was then heat treated to 1000° C. for 2 hrs under nitrogen atmosphere. The resulting carbon was used in casting an anode electrode for a lithium ion capacitor. The electrode consists of 90 wt % of activated carbon obtained from the coconut shell flour, 5 wt % Timcal Super C-45 conductive carbon, and 5 wt % KYNAR 761 PVDF (MW: 300,000 to 400,000) as a binder.

Figure 5:
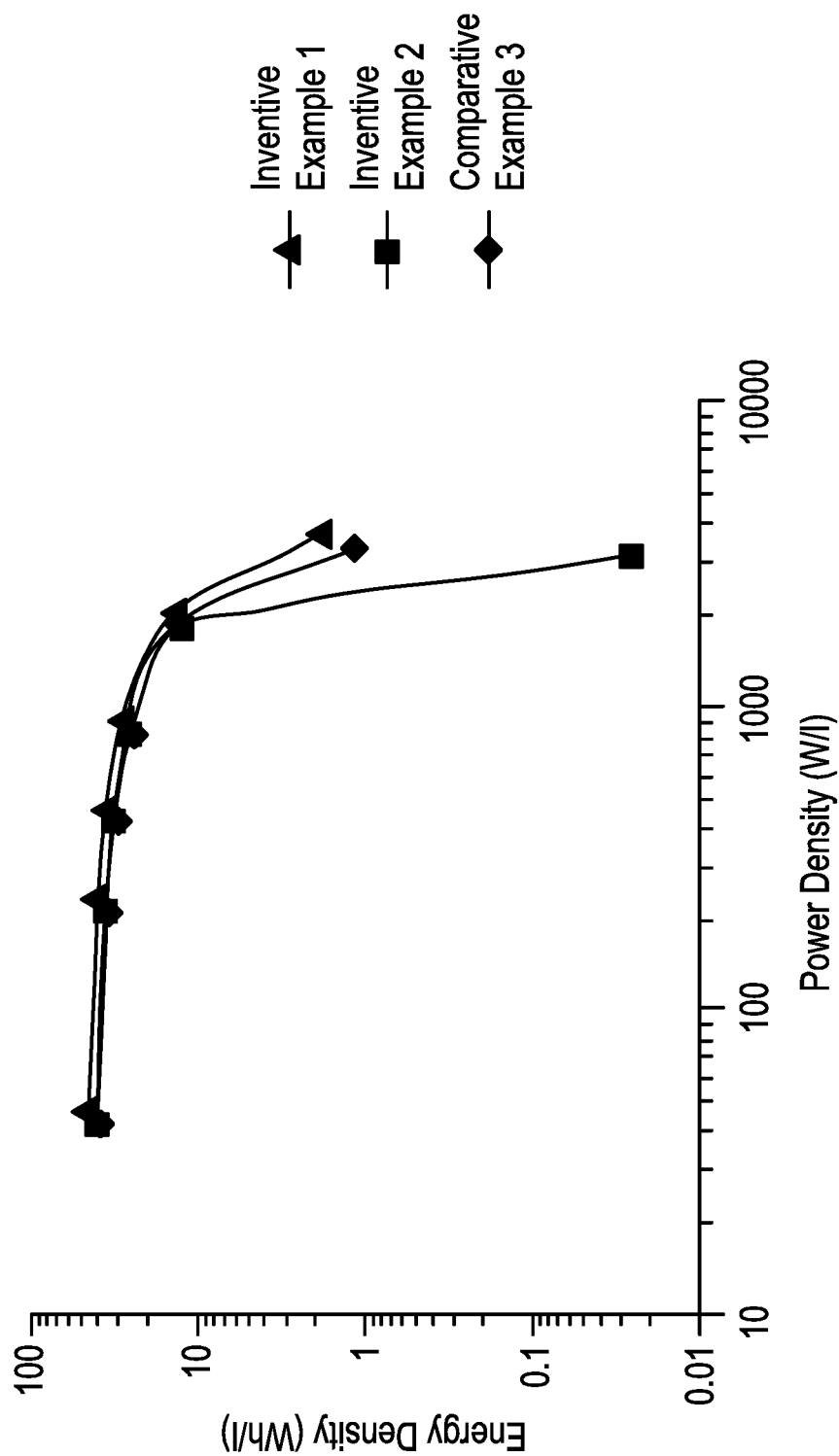
FIG. 5 shows a volumetric Ragone plot for anode electrodes made with PVDF polymers of Examples 1, 2, and 3, having different molecular weights.

The anode was prepared as follows: 3.6 grams of coconut shell sourced carbon and 0.2 grams of Timcal Super C-45 were balled milled in a Retsch PM-100 ball mill for 15 mins at 350 rpm. 0.2 grams of PVDF was added to the coconut shell carbon and Timcal Super C-45 mixture and the mixture was ball-milled for an additional 15 minutes at 350 rpm. Several drops of N-methyl pyrrolidinone (NMP) were added to the mixture to form a paste and the paste was then coated on a copper foil (Oak Mitsui TLB-DS), and passed through a rolling mill to produce a carbon layer thickness of 4 mil. The calendared electrodes were punched to make 14 mm diameter circular electrodes. The punched electrodes were then dried 16 hrs at 120° C. under vacuum. The punched anode electrodes were spray coated with a slurry of lithium metal particles, lithium salt (LiPF$_6$), mineral oil, and SBR binder in THF to coat the anode with a layer of in situ formed lithium composite powder (LCP). The spray slurry has a weight ratio of lithium metal particles:LiPF$_6$ salt: mineral oil of 80:17.8:2.2. The SBR binder was 0.5 wt % of the combined total weight of lithium metal particles, mineral oil, and LiPF$_6$ salt. The weight ratio of solids (lithium metal particles, mineral oil, LiPF$_6$ salt, and SBR binder): solvent (THF) was 20:80. The sprayed anode electrode was dried 16 hrs under vacuum at 120° C. The sprayed and dried anodes were used to build a lithium ion capacitor in a CR2032 format cell. The lithium ion capacitor was built with a NKK-4425 separator and coupled with a cathode electrode made from 85 wt % wheat flour alkali activated carbon (the Corning carbon mentioned below), 10 wt % PTFE (DuPont 601A Teflon PTFE), and 5 wt % Cabot Black Pearl 2000 carbon black. The anode having PVDF 1 had a coat of 8.2 mg of lithium composite powder (LCP). 1M LiPF$_6$ in 20:20:60 by volume of ethylene carbonate:dimethyl carbonate:methyl propionate with 5 wt % fluorinated ethylene carbonate as an additive was used as an electrolyte for the lithium ion capacitor. The lithium ion capacitor having PVDF 1 based anodes showed an energy density of 45.57 Wh/l and power density of 46.78 W/l at 1 C rate (see FIG. 5 and Table 4).

The lithium composite powder (LCP) is an encapsulated lithium particle comprising: a core comprised of at least one of: lithium; a lithium metal alloy; or a combination thereof; and a shell comprised of a lithium salt, and an oil, the shell encapsulates the core, and the particle has a diameter of from 1 to 500 microns (see commonly owned and assigned U.S. Ser. No. 13/673,019, filed Nov. 9, 2012, entitled "LITHIUM COMPOSITE PARTICLES," and U.S. Ser. No. 14/493,886, filed Sep. 23, 2014, entitled "ENCAPSULATED LITHIUM PARTICLES AND METHODS OF MAKING AND USE THEREOF"). The LCP is used for pre-doping the anode.

The Corning carbon was made from a wheat flour precursor. The wheat flour was carbonized at from 650 to 700° C. The carbonized carbon was ground to a particle size of approximately 5 microns. The ground carbonized carbon was then activated at 750° C. with KOH (alkali) in a weight ratio of 2.2:1 KOH:carbon for 2 hrs. The carbon was further washed with water to remove any remaining KOH. The resulting activated carbon was then treated with HCl to neutralize any trace of KOH and then washed with water to neutralize the carbon to a pH of 7. The activated carbon was then heat-treated under nitrogen and hydrogen forming gas at 900° C. for 2 hrs.

Example 2

Inventive KYNAR 301F-PVDF 2 Example 1 was repeated except that a PVDF 2 was used as the PVDF binder in the fabrication of the anode electrode for the lithium ion capacitor and a lithium composite powder (LCP) loading of 8.7 mg was spray coated on the anode electrode. The lithium ion capacitor having an anode including PVDF 2 had an energy density of 40.23 Wh/l and power density of 42.71 W/l at 1 C rate (see FIG. 5 and Table 4).

TABLE 4

Energy and Power performance at IC rate for LICs having anodes made with different molecular weight PVDFs.

| Example # PVDF Binder | Energy Density at 1C (Wh/l) | Power Density at 1C (W/l) |
|---|---|---|
| Example 1 PVDF 1 | 45.57 | 46.78 |

TABLE 4-continued

Energy and Power performance at IC rate for LICs having anodes made with different molecular weight PVDFs.

| Example # PVDF Binder | Energy Density at 1C (Wh/l) | Power Density at 1C (W/l) |
|---|---|---|
| Example 2 PVDF 2 | 40.23 | 42.71 |
| Comparative Example 3 PVDF 3 | 39.72 | 42.69 |

Comparative Example 3

KYNAR HSV 900-PVDF 3 Example 1 was repeated except that PVDF 3 was used as the PVDF binder in the fabrication of the anode for the lithium ion capacitor and a LCP loading of 8.7 mg was spray coated on the carbon coated anode. The lithium ion capacitor having an anode including PVDF 3 had an energy density of 39.72 Wh/l and power density of 42.69 W/l at 1 C rate (see FIG. 5 and Table 4).

The data shows that the molecular weight of the binder in the anode is a significant parameter that affects the electrochemical performance of the device in addition to mechanical integrity. It has been found that a lower molecular weight PVDF binder having a weight average molecular weight of from 300,000 to 400,000 provides superior devices.

The disclosure has been described with reference to various specific embodiments and techniques. However, it should be understood that many variations and modifications are possible while remaining within the scope of the disclosure.

What is claimed is:

1. A lithium ion capacitor, comprising:
   an anode comprising:
      a conductive support;
      a first mixture coated on the conductive support comprising:
         an interclating carbon in from 85 to 95 wt %;
         a conductive carbon black in from 1 to 8 wt %; and
         a PVDF binder in from 3 to 10 wt %, where the wt % is based on the total weight of the first mixture, and where the PVDF binder has a weight average molecular weight of from 300,000 to 400,000; and
      a second mixture coated on the first mixture, the second mixture comprising micron-sized lithium metal particles having an encapsulating shell comprised of $LiPF_6$, mineral oil, and a thermoplastic binder.

2. The capacitor of claim 1 further comprising:
   a separator;
   a cathode electrode coupled with the separator, the cathode electrode comprising an activated carbon in from 80 to 95 wt %, a fluorinated polymer in from 3 to 12 wt %, and carbon black in from 1 to 8 wt %; and
   an electrolyte comprising an inorganic lithium salt in a non-aqueous and aprotic solvent.

3. The capacitor of claim 2 wherein the activated carbon is a high surface area carbon.

* * * * *